United States Patent [19]

Petrow et al.

[11] 3,992,331

[45] Nov. 16, 1976

[54] CATALYTIC PLATINUM METAL PARTICLES ON A SUBSTRATE AND METHOD OF PREPARING THE CATALYST

[75] Inventors: Henry G. Petrow, Watertown; Robert J. Allen, Saugus, both of Mass.

[73] Assignee: Prototech Company, Newton, Mass.

[22] Filed: Dec. 20, 1974

[21] Appl. No.: 535,031

Related U.S. Application Data

[63] Continuation-in-part of Ser. No. 430,190, Dec. 28, 1973, which is a continuation of Ser. No. 153,824, June 16, 1971, abandoned.

[52] U.S. Cl. .............................................. 252/472
[51] Int. Cl.² ........................................ B01J 23/42
[58] Field of Search .......... 252/455 R, 460, 466 PT, 252/472; 423/213.5, 213.7

[56] References Cited

UNITED STATES PATENTS 3,531,329   9/1970   Selwitz ............................... 136/121

*Primary Examiner*—W. J. Shine
*Attorney, Agent, or Firm*—Rines and Rines, Shapiro and Shapiro

[57] ABSTRACT

This disclosure deals with novel very fine, particulated colloidal platinum of the 15-25 Angstrom size range of unusual catalytic activity and particularly adapted for adsorption upon various substrate for use as catalytic structures and the like, and produced from a new platinum sulfite acid and a sol derived therefrom.

7 Claims, No Drawings

CATALYTIC PLATINUM METAL PARTICLES ON A SUBSTRATE AND METHOD OF PREPARING THE CATALYST

This application is a continuation-in-part of application, Ser. No. 430,190, filed Dec. 28, 1973, as a continuation, in turn, of parent application, Ser. No. 153,824, filed Jun. 16, 1971, now abandoned; and, in response to Patent Office restriction requirements, the present application is directed to the catalytic structure features and techniques of the invention disclosed in said parent application.

The present invention relates to new platinum compounds, sols and particulated platinum deposits derived therefrom and to methods of preparing the same, being specifically, though not exclusively, concerned with use in a wide variety of catalytic and similar applications.

The art is, of course, replete with numerous compounds and processes employed to provide platinum deposits for use as catalysts in a myriad of applications including oxidation, hydrogenation, dehydrogenation, reforming, cracking, chemical reaction-aiding, contaminant burning, electrochemical cell electrode operation and the like, all hereinafter generically connoted by reference to "catalytic" usage. Particulated platinum has been employed to provide increased effective surface area, as by adherence to rough substrata, such as carbon, alumina and other substances, such deposits being obtained from compounds such as platinum tetrachloride, chloroplatinic acid and the like. As described, for example, in *Actes Du Deuxieme Congres International De Catalyse*, Paris, 1960, pp. 2236, 2237, the average particle size of such particulated platinum lies in the range of from about 45 to 250 Angstroms, and it has not proven possible commercially to provide much smaller particles and thus obtain vastly increased catalytic efficiency.

In accordance with discoveries underlying the present invention, however, it has, in summary, now been found possible consistently to produce excellently adhering particulated platinum deposits in the much finer 15–25 Angstrom range; and it is to new methods, compounds and sols for producing the same that the present invention is accordingly primarily directed.

A further object of the invention is to provide a novel complex platinum acid compound and colloidal sol of more general application, as well.

Still another object is to provide novel catalytic structures to which such finely deposited platinum particles are adsorbed and adhered.

The present application is particularly directed to catalytic structures and methods that use or employ derivatives of such novel complex platinum compounds.

Other and further objects will be explained hereinafter and are more particularly delineated in the appended claims.

A first discovery underlying a part of the invention resides in the rather unexpected fact that a novel complex platinum sulphite acid void of chlorine may be prepared from the chloroplatinic acid and particularly adapted for the formation of a colloidal sol from which extremely finely particulated platinum may be deposited. While prior experience has led those skilled in the art to consider either that adding $SO_2$ to chloroplatinic acid would invariably result in reducing the platinum to the "2" state, without replacing chloride in the complex with $SO_3^{--}$, yielding chloroplatinous acid (see, for example, H. Remy, *Treatise on Inorganic Chemistry*, Vol. 2, p. 348), or that the reaction of $SO_2$ with a platinum compound resulted in its reduction to the metallic or zero valence state ("Applied Colloidal Chemistry," W. N. Bankcroft, McGraw Hill, 1926, p. 54), it has been discovered that through appropriate pH and other controls, a complex platinum acid containing sulphite (and to the complete exclusion of chloride) is decidedly achievable. And from such complex acid, unusual colloidal sols depositing particulate platinum in the 15–25 Angstrom range can readily be obtained, and thus vastly superior catalytic performance attained.

Specifically, one of the preferred methods for the preparation of this novel complex platinum acid (represented substantially by a formula containing two moles of $SO_3^{--}$ per mole of platinum) involves the neutralizing of chloroplatinic acid with sodium carbonate, forming orange-red $Na_2Pt(Cl)_6$. Sodium bisulfite is then added, dropping the pH to about 4, and with the solution changing to pale yellow and then to a substantially colorless shade. Adding more sodium carbonate brings the pH back to neutral (7), and a white precipitate forms in which the platinum has been found to be contained in excess of 99% of the platinum contained in the chloroplatinic acid starting sample. It was believed (now confirmed) that this precipitate contains six atoms of sodium and four moles of $SO_3^{--}$ per atom of platinum. It is slurried with water, and then enough strong acid resin is added (such as sulfonated styrene divinyl benzene in the hydrogen form — DOWEX-50, for example), to replace three of the Na atoms. The solution is filtered to remove resin and then passed through an ion-exchange column with sufficient of the said acid resin to replace the other three Na atoms. Inherently, during this two-step cation exchange, copious quantities of $SO_2$ are liberated, amounting to a loss of substantially two moles of $SO_2$/mole Pt. Boiling to concentrate the solution, results in the novel complex sulfite platinum acid compound above discussed containing groups of (OH) and $H_3Pt(SO_3)_2$, free of excess unbound $SO_2$.

In compliance with a requirement in the earlier applications from which the present application is continued, for evidence of the reasons for the conclusion as to the above formulations, a summary of such evidence is herein presented, though it is not in any way part of the essential disclosure of this application and is not required for the practice of the invention as originally disclosed, since precisely following the steps of the disclosure of said applications will produce the precise products and results of the invention as originally described.

Proof of the above-stated complex character of this novel platinum acid has been obtained by reacting 0.0740 g-mole of chloroplatinic acid in the form of the commercial material containing 40% by weight of Pt to form the "white precipitate" precisely in accordance with the method described above and in the said prior applications. The white precipitate weighed 48.33 g, after filtering, washing and drying at 150° C (to constant weight). The filtrate contained 40 ppm platinum, as determined by atomic adsorption, showing that more than 99% of the original platinum contained in the sample of chloroplatinic acid was present in the precipitate. Thus, the precipitate has an empirical formula weight of about 653 based on one atom of Pt [48.33/0.07040] ≅ 653.

Chemical analysis showed that the salt contained 21.1% Na (by atomic adsorption) and 48.7% $SO_3$ (by oxidative fusion and $BaSO_4$ precipitation and by $KMnO_4$ titration), thereby confirming the presence of substantially 6 Na and 4 $SO_3$ per Pt atom.

The precipitate was then converted to the complex acid solution in accordance with the precise procedure described above and in said prior applications. It was boiled to a concentration approximately 2 molar in Pt (2 g atoms Pt/liter of solution).

When the acid was concentrated to this strength, $SO_2$ was no longer evolved.

1. A sample of substantially water-free complex platinum acid, prepared by distillation under high vacuum, was found to contain 52% Pt by weight determined by thermogravimetric analysis.
2. A sample of complex platinum acid (in solution) was found to have a sulfur content of 42.6% by weight, as $SO_3$, determined by oxidative fusion and $BaSO_4$ precipitation and by oxidometric titration with $KMnO_4$, i.e. 2 moles of sulfite/mole Pt.
3. Titration of a sample of the complex platinum acid with standard base showed a characteristic titration curve with three titratable hydrogen ions per atom of Pt, amounting to 0.8% by weight, two of which were strongly acid (i.e. completely dissociated) and the third quite weakly acid ($K_a \sim 10^{-8}$ for the third $H^+$ ion).
4. A sample of complex platinum acid was found to contain one OH group per atom Pt, or 4.54% by weight OH, determined by neutralizing the three acid hydrogens with NaOH to pH 9.5, then reacting with excess sodium sulphite solution of natural pH = 9.5, thereby gradually reforming white precipitate having the above described composition, and raising the pH of the reaction mixture above 12, and back-titrating with $H_2SO_4$ to pH 9.5.
5. A sample decomposed at about 400° C in nitrogen yielded only oxides of sulfur ($SO_2$ and $SO_3$) and water in the gas phase, and Pt metal residue.
6. Addition of silver nitrate to the acid yielded a yellow product insoluble in dilute sulfuric acid.

From these experiments, the following is concluded:

1. The acid contains only H, O, Pt and S. (The replacement of $Na^+$ by $H^+$ in the ion exchange step cannot introduce any other element); Cl is absent.
2. The acid contains Pt and S in the ratio of 1:2.
3. The sulfur is present as sulfite as shown by the analysis and by the high temperature decomposition of the acid in nitrogen.
4. The sulfite has to be complexed because (a) the complex acid (no $SO_2$ odor) is completely dissociated whereas the ionization constants of $H_2SO_3$ (which is odorous) are $1.54 \times 10^{-2}$ and $1.02 \times 10^{-7}$, respectively; (b) the complex acid is more soluble in water than $H_2SO_3$ at the boiling point (max. solubility of $SO_2$ is 5.8g/l or 0.07 molar in $H_2SO_3$ at 100° C vs. the 2 molar acid produced by the method of this invention); and (c) silver sulfite is soluble in dilute sulfuric acid, whereas the silver salt of the new complex platinum acid is insoluble in dilute sulfuric acid.
5. The acid is trivalent, having two strongly acidic and a third weakly acidic hydrogen as evidenced by a characteristic titration curve. An unusual kinetic effect occuring during titration of the third hydrogen suggests the possibility that it could be part of the sulfite ligand.

It is thus apparent that the complex platinum sulfite acid of the invention has the emperical formula $H_3Pt(SO_3)_2OH$.

Turning back, now, to the said white precipitate, and in view of the Patent Office requirement promulgated since the filing of the said earlier applications for disclosure of all known pertinent prior art, attention is invited to "The Chemistry of the Co-ordination Compounds," edited by John C. Bailar Jr., ACS monograph, Reinhold Publishing Co., 1956, p. 57–58, where a compound of composition $Na_6Pt(SO_3)_4$ is disclosed (with no reference to any utility), but as having to be prepared by the complicated process of making the appropriate isomer of a platinum ammine chloride, Pt $(NH_3)_2 Cl_2$, and then converting it to $Na_6Pt(SO_3)_4$. This further points up the highly novel and greatly simplified high-yield technique of the present invention, starting with chloroplatinic acid and preparing the sodium platinum sulfite complex white precipitate (for which the present invention has found and taught important utility in the development of the novel complex platinum acid of the invention), substantially quantitatively.

From this novel complex platinum acid, a new colloidal sol may be prepared by decomposing the acid by heating it to dryness in air (oxidizing) and holding the temperature at about 135° C for about an hour, producing a black, glassy material which, when dispersed in water, yields a novel colloidal platinum-containing sol having an average finely divided platinum particle size of from about 15–25 Angstroms, with substantially all the platinum particles consistently lying within this range. Some platinum metal and sulfuric acid may be present and may be respectively removed by filtering (and re-cycling use of the metallic platinum) and by treating with hydroxide resin such as DOWEX 2 or the like. A jet black colloidal sol with these fine size particles is thus obtained.

From this novel product, a host of vastly improved catalytic surfaces have been obtained.

As a first example, the sol has been deposited or absorbed on a carbon black substrata (such as electrically conductive Norit A) to form a catalytic electrode structure (by means well known in the art and comprising a conventional current collector). One of the uses of such an electrode structure for example, is as a cathode electrode in fuel cells and the like. This has been effected by reducing the adsorbed metal of the sol with hydrazine; forming on the carbon, platinum metal crystals of measured approximately 20-Angstrom size. For use as an oxygen cathode electrode in an air-hydrogen 135° C fuel cell with phosphoric acid electrolyte and a platinum anode, with both electrode sizes about 1 inch by 1 inch, about 2–10% by weight of adsorbed platinum was so reduced with about 10% solution of hydrazine to form and adhere the fine particulate platinum on the electrically conductive carbon substrate, the electrode structure exclusive of conventional components being about 70% by weight of Norit A carbon and 30% by weight of Teflon (i.e. a typical fluorinated hydrocarbon polymer) emulsion, such as TFE 30. Most remarkable cathode performance was obtained in this fuel cell, with cathode loading of only 0.25 milligrams/cm.$^2$ of platinum, as follows:

| Current | Voltage |
|---|---|
| 100 amperes/ft.² | 660 millivolts |
| 200 | 598 |
| 300 | 548 |
| 400 | 500 |

This improved performance is evident from the fact that in an identically operating cell with the cathode formed by adhering to the carbon substrate platinum particles from platinum black of nominal surface area of 25 meters ²/gram, such cell performance could only be obtained with ten times the platinum loading (i.e. 2 milligrams/cm.²). Similar performance could also be obtained in the same cell with the platinum deposited on the carbon from platinum tetrachloride and chloroplatinic acid (approximately 40-80 Angstrom particles), but only with three to four times the platinum loading. Prior phosphoric acid fuel cell operation with other platinum catalysts is described, for example, by W. T. Grubb et al., J. Electrochemical Society III, 1015, 1964, "A High Performance Propane Fuel Cell Operating in the Temperature Range of 150°–200° C." Prior methods of fabricating fuel cell electrodes are described, for example, in U.S. Pat. No. 3,388,004.

As another example, similar electrochemical cell electrodes were operated as air cathodes in the same cell as the first example with as little as 0.04 milligrams/cm.² platinum loading, and with as much as 0.5 milligrams/cm.². The respective cell performance characteristics were 100 amperes/ft.² at 530 millivolts, and 100 amperes/ft.² at 690 millivolts.

In connection with the two examples above, moreover, not only has greatly improved catalytic efficiency been obtained as a result of the extremely high surface area provided by such fine colloidal particles, but this enhanced activity was found to be maintainable over several thousand hours of operation with no detectable decay in cell performance.

As a further example, such catalytic structures for electrode use have also been prepared without the step of converting the complex platinum sulfite acid to the sol. Specifically, the acid was adsorbed on the carbon substrate, decomposed with air, and reduced with hydrogen. During such reduction, it was observed that H₂S evolved, indicating the retention of sulfide materials; but the H₂ reduction at 400° C was found to remove substantially all sulfides. Again particles in the 20-Angstrom range were produced with similar electrode performance to that above-presented.

A still additional example is concerned with deposition or adhering to a refractory non-conductive substrate of alumina. Sufficient complex platinum sulfite acid to contain 200 milligrams of platinum was applied to 50 cc. of insulative eta-alumina pellets, about ⅛ inch by ⅛ inch. The mixture was dried at 200° C and, to effect decomposition and adsorption, was held at 600° C in air for about fifteen minutes. This resulted in a very uniform distribution of fine platinum particles (approximately 20 Angstroms) throughout the alumina surface structure, but not within the same. This was reduced by H₂ at 500° C for about half an hour, providing a significantly improved oxidation catalyst having the following properties, considerably improved from Houdry Platinum-on-Alumina Catalyst Series A, Grade 200 SR, a typical present-day commercial product, under exactly comparable conditions:

| Ignition Temperature For | Invention | Houdry |
|---|---|---|
| 1. Methane | 355° C | 445° C |
| 2. Ethanol | 85° C | 125° C |
| 3. Hexane | 145° C | 185° C |

Another example, again bearing upon this oxidation catalyst application, involves the same preparation as in the immediately previous example, but with two and a half times the amount of particulated platinum (i.e. 500 milligrams). The following results were obtained:

| Ignition Temperature For | Invention |
|---|---|
| 1. Methane | 340° C |
| 2. Ethanol | 30° C (room temperature) |
| 3. Hexane | 130° C |

Still another example, identical to the previous one, but with 2 grams of platinum adhered to the 50 cc alumina, was found to produce the following results:

| Ignition Temperature For | Invention |
|---|---|
| 1. Methane | 250° C |
| 2. Ethanol | 30° C (room temperature) |
| 3. Hexane | 90° C |

Still another example, 200 milligrams of the preformed sol was adsorbed on alumina, and reduced with H₂ and found to produce the following results:

| Ignition Temperature For | Invention |
|---|---|
| 1. Methane | 310° C |
| 2. Ethanol | 45° C |
| 3. Hexane | 110° C |

For the usage of the last four examples, a range of platinum of from about 0.01 to 5% may be most useful, depending upon the economics and application.

As still a further example, the deposition or adsorption described in the last four examples, above, may also be effected on other refractory oxides in similar fashion, including silica and zirconia.

Lastly, other refractories, such as zeolites, calcium phosphate and barium sulphate, may be similarly coated by the processes of the last four examples.

While the novel complex platinum compounds, acid and/or sol may be prepared by the preferred method previously described, it has been found that the acid may also be prepared from hydroxyplatinic acid (H₂Pt(OH)₆) by dissolving the same cold in about 6% aqueous H₂SO₃, and evaporating to boil off excess SO₂. This appears to yield the complex platinum sulfite acid material, also (identified by its characteristic titration curve). While this process involves a lower pH, it should be noted that chloride is excluded by the starting material.

As before stated, while only illustrative electrode and catalytic uses have been described, the invention is clearly applicable to a wide variety of electrodes, oxidation, hydrogenation, de-hydrogenation, reforming, cracking, chemical reaction-aiding, contaminant burning and other uses, as well. Further modifications will also occur to those skilled in this art and all such are considered to fall within the spirit and scope of the invention as defined in the appended claims.

What is claimed is:

1. In a method of preparing a catalytic structure suitable for high-temperature operation, the steps of applying a complex platinum sulfite acid having the empirical formula $H_3Pt(SO_3)_2OH$ to a substrate, thermally decomposing said applied acid in air, and reducing the decomposed acid to form platinum metal particles having an average particle size of the order of substantially 15–25 Angstroms.

2. A method in accordance with claim 1, wherein said acid is formed by reacting an aqueous solution of a substantially sulfite-free platinum acid or salt with a sulfiting agent.

3. A method in accordance with claim 2, wherein said platinum acid is hydroxyplatinic acid and said platinum salt is sodium chloroplatinate and said sulfiting agent is one of sodium bisulfite and sulfurous acid.

4. In a method of preparing a catalytic structure suitable for high-temperature operation, the steps of thermally decomposing in air a complex platinum sulfite acid having the empirical formula $H_3Pt(SO_3)_2OH$, dispersing said decomposed acid in water to form a colloidal platinum-containing sol, applying said sol to a substrate, and reducing the decomposed acid in the applied sol, thereby depositing on said substrate platinum metal particles having an average particle size of the order of substantially 15–25 Angstroms.

5. A method in accordance with claim 4, wherein said acid is formed by reacting an aqueous solution of a substantially sulfite-free platinum acid or salt with a sulfiting agent.

6. A method in accordance with claim 5, wherein said platinum acid is hydroxyplatinc acid and said platinum salt is sodium chloroplatinate and said sulfiting agent is one of sodium bisulfite and sulfurous acid.

7. A chloride-free catalytic structure suitable for high-temperature operation, comprising a substrate having adsorbed thereon platinum metal particles substantially all of the order of substantially 15–25 Angstroms in particle size derived from the thermal decomposition in air and subsequent reduction to platinum metal particles of a complex platinum sulfite acid having the empirical formula $H_3Pt(SO_3)_2OH$.

* * * * *